United States Patent
Suenaga et al.

(10) Patent No.: US 7,359,098 B2
(45) Date of Patent: Apr. 15, 2008

(54) SYSTEM AND METHOD FOR TESTING SCAN AND FAX JOBS

(75) Inventors: Yoshiko Suenaga, Kawasaki (JP); Kazuaki Kidokoro, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 851 days.

(21) Appl. No.: 10/235,848

(22) Filed: Sep. 6, 2002

(65) Prior Publication Data
US 2004/0047010 A1 Mar. 11, 2004

(51) Int. Cl.
*H04N 1/00* (2006.01)
*H04N 1/46* (2006.01)

(52) U.S. Cl. .............. 358/504; 358/400; 358/474; 358/405; 358/437

(58) Field of Classification Search .......... 358/504, 358/400, 474, 405, 437
See application file for complete search history.

(56) References Cited

U.S. PATENT DOCUMENTS

| | | | | |
|---|---|---|---|---|
| 5,689,443 A | * | 11/1997 | Ramanathan | ............ 702/183 |
| 5,818,978 A | * | 10/1998 | Al-Hussein | ............ 382/296 |
| 6,370,480 B1 | * | 4/2002 | Gupta et al. | ............ 702/39 |
| 6,473,659 B1 | * | 10/2002 | Shah et al. | ............ 700/79 |
| 6,606,163 B1 | * | 8/2003 | Suzuki et al. | ............ 358/1.15 |
| 6,754,230 B2 | * | 6/2004 | Purpura et al. | ............ 370/468 |

FOREIGN PATENT DOCUMENTS

| | | |
|---|---|---|
| JP | 2000-174949 A | 6/2000 |
| JP | 2001-77959 A | 3/2001 |

* cited by examiner

Primary Examiner—Twyler Lamb Haskins
Assistant Examiner—Benjamin Dulaney
(74) Attorney, Agent, or Firm—Foley & Lardner LLP

(57) ABSTRACT

A system and method for testing scan and fax jobs includes receiving a job request from a user to scan or fax an image, the job request including one or more parameters, providing a test image based on the one or more parameters for the job request, generating a test job based on the identified test image and the one or more parameters for the job request, and processing the test job. Information regarding the result of the execution of the test job is stored. It is then determined if the job request can be executed correctly based on the stored information.

24 Claims, 4 Drawing Sheets

SYSTEM AND METHOD FOR TESTING SCAN AND FAX JOBS

FIELD OF THE INVENTION

The present invention relates generally to image processing systems, and more particularly to an image processing system and method for testing and verifying the suitability and correctness of a fax or scan job prior to the execution of the job.

BACKGROUND OF THE INVENTION

Image processing functions include, among other things, printing, copying, faxing and scanning. These functions can be performed by separate image processing devices, such as copiers, printers, faxes and scanners. Alternatively, a single image processing device, sometimes referred to as a multi-function peripheral (MFP) device, can perform all of these functions itself.

When performing any of these image processing functions, the user may set one or more parameters or settings. For example, when copying a document, the user may specify the size of paper on which to make the copy, color versus black and white, ink density, and number of copies, as well as many other possible settings. These parameters are typically set at the copier or MFP. For some other functions, such as scanning and faxing, the user may be required to set the parameters of the job at the user's workstation or PC first, and then execute the job at the applicable image processing device, such as the MFP.

For the functions that require the user to first set the parameters for the job at the user's workstation or PC and then execute the job at the applicable image processing device, there may a problem in executing the job if the parameters were set incorrectly or if the image processing device cannot process the parameters correctly. In the event there is an error due to improperly set parameters or the inability of the image processing device to process the parameters correctly, the user is forced to go back to the workstation or PC, change or fix the parameters, and return to the image processing device to execute the job. This process may have to be repeated several times until the job is finally executed properly. This repeated processing results in several inefficiencies, including the loss of time and wasting of resources.

SUMMARY OF THE INVENTION

Briefly, in one aspect of the invention, a method for one of a scan and a fax job includes receiving a job request from a user to scan or fax an image, the job request including one or more parameters, providing a test image based on the one or more parameters for the job request, generating a test job based on the identified test image and the one or more parameters for the job request, and processing the test job. Information regarding the result of the execution of the test job is stored. It is then determined if the job request can be executed correctly based on the stored information.

In another aspect of the invention, the information is stored in a job log, and the information stored in the job log includes information regarding whether the test job was processed successfully.

In yet another aspect of the invention, the job log information is transmitted to the user.

DETAILED DESCRIPTION OF THE PREFERRED EMBODIMENTS

Figure 1:
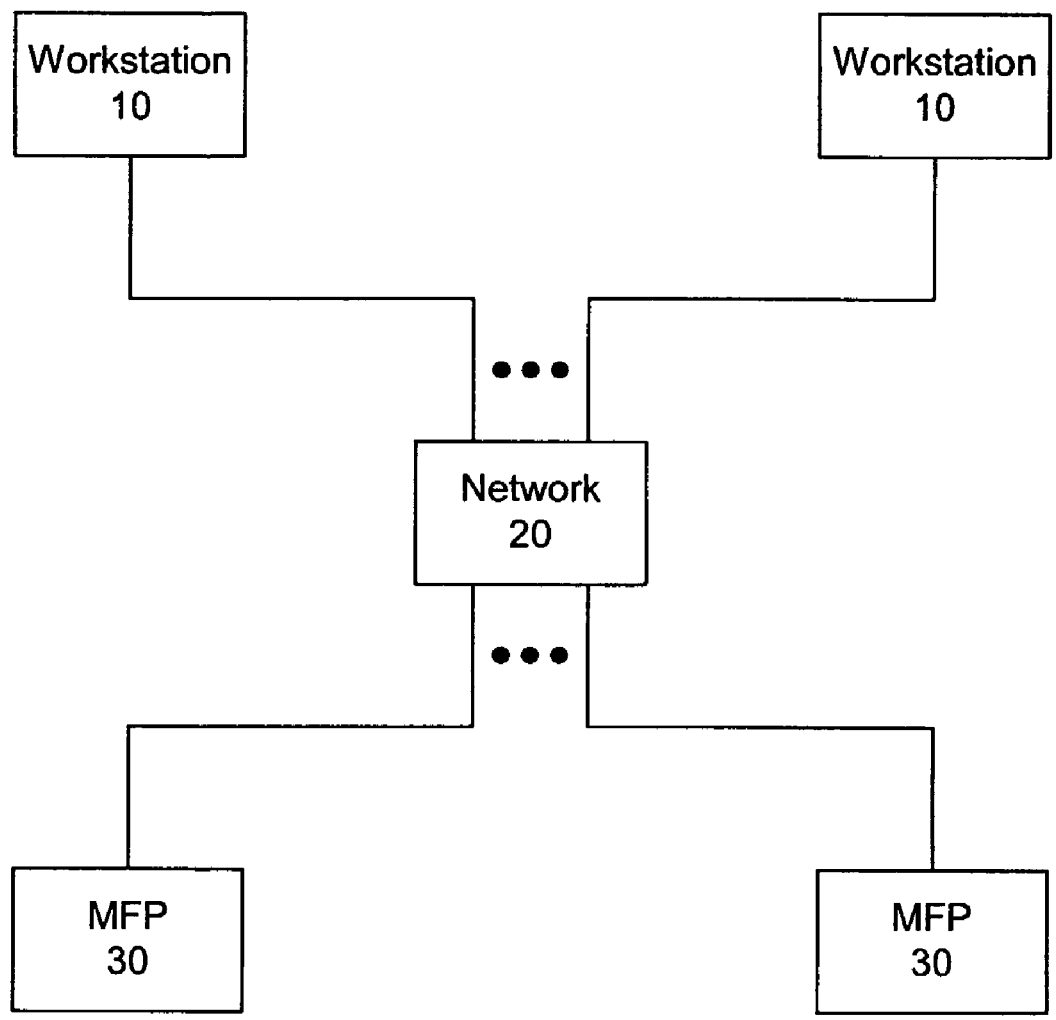
FIG. 1 is a block diagram of a communication system consistent with the present invention.

FIG. 1 is a block diagram of a communication system consistent with the present invention. As shown in FIG. 1, the communication system includes one or more workstations 10, a network 20, and one or more multi-function peripherals (MFPS) 30. Each of the workstations 10 and each of the MFPs 30 are coupled to the network 20. The network 20 may be implemented as a local network, such as a LAN, or as a public network, such as the Internet.

The workstation 10, which may be a PC or a server, includes a CPU, a main memory, a ROM, a storage device and a communication interface all coupled together via a bus in one embodiment consistent with the present invention. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

The communication interface for the workstation 10 provides a two-way data communication coupling via a network link to the network 20. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information, to and from the network 20.

If the network 20 is implemented as the Internet, the workstation 10 or server can transmit a requested code for an application program through the Internet, an ISP, the local network and the communication interface. The received code can be executed by the CPU in the workstation or server as it is received, stored in the storage device, or stored in some other non-volatile storage for later execution. In this manner, a user at the workstation or server may obtain application code in the form of a carrier wave.

The MFP 30 is a device which can perform the functions of multiple devices, such as a printer, a fax machine, a copier, a plotter, a scanner or any other functional device that generates or processes images or text. MFPs 30 are also known as multifunction printers. It should be understood that each MFP 30 may be considered any one of a printer, a fax machine, a copier, a plotter and a scanner, as well as any combination thereof. Like the workstation 10, the MFP 30 may have a CPU, a main memory, a ROM, a storage device and a communication interface all coupled together via a bus. The MFP 30 may also have a communication interface to provide a two-way data communication coupling via a network link to the network 20. The network link to the network 20 enables the MFP 30 to receive data from and to output data to the workstation 10. Instead of a network link, MFPs 30 may use a Universal Serial Bus (USB) to connect to a USB port on the workstation 10.

In operation, the workstations 10 communicate with the MFPs 30 via the network 20 or via a more direct connection, such as the USB. This communication enables the workstation 10 to request the MFP 30 to perform a function, such as print a document or send or receive a fax. In addition, the workstation 10 can request information from the MFP 30.

To communicate with the MFP 30, the workstation 10 may use a network protocol such as SNMP, which is a protocol for monitoring and managing systems and devices in a network. The functions supported by the protocol are the request and retrieval of data, the setting or writing of data, and traps that signal the occurrence of events. The data being monitored and managed is defined by a management information base (MIB). A MIB includes the specification and formal description of a set of objects and variables that can be read and possibly written using the SNMP protocol. SNMP and similar communication protocols can also be used with non-networked connections, such as USB, FireWire and IEEE 1284 (Parallel).

When performing certain image processing jobs, such as scanning and faxing, a user may be required to create the job and a number of settings or parameters for the job at the user's workstation 10. In addition to the setting or parameter information for the job, the user can also specify the destination of the image processing results. For example, the user can have the image processing results transmitted to an e-mail address, saved as a file at a particular location in the network 20 or stored in a file storage or box within a MFP 30.

After creating the job at the workstation 10, the user then goes to the image processing device, such as MFP 30. The user then places the document having the image the user wishes to process, such as for a scan or fax job, on the image processing device. The image may be in color or black and white image, and may be text, graphical images, or photographs, or some combination thereof. After placing the document on the image processing device, the user has the document processed in accordance with the parameters and job setting information established at the workstation 10.

When processing the job, such as scanning or faxing, it is possible that the job cannot be processed properly, or in some cases, cannot be processed at all. For example, if the user wants the document scanned and sent by e-mail to a particular address, there may be a limitation on the size of the document that can be included in the e-mail, such as 20 megabytes. If the size of the scanned document exceeds the size limitation of the e-mail, the scanned document cannot be sent properly. As a result, the user is forced to return to the user's workstation to adjust the settings or parameters for the job. In addition, if the document is very large requiring a lot of time to scan it all, there can be a substantial loss of time because the document needs to be rescanned each time the job parameters or settings are adjusted.

In another example, a user may desire to scan a document and store an image of the document in a particular file server that requires the user to enter a password to gain entry to the file server. If the password is incorrect and not accepted, the scanned document cannot be stored properly in the file server, thereby requiring the user to rescan the document with the proper password. Similarly, to store in the file server, the user may need to set a file path. If the user provides an invalid file path, the scanned document would not be stored properly in the file server, and the user would need to rescan the document and provide the valid file path. One skilled in the art will recognize that there are numerous other settings or parameters that may not be processed properly and need to be corrected or changed.

Figure 2:
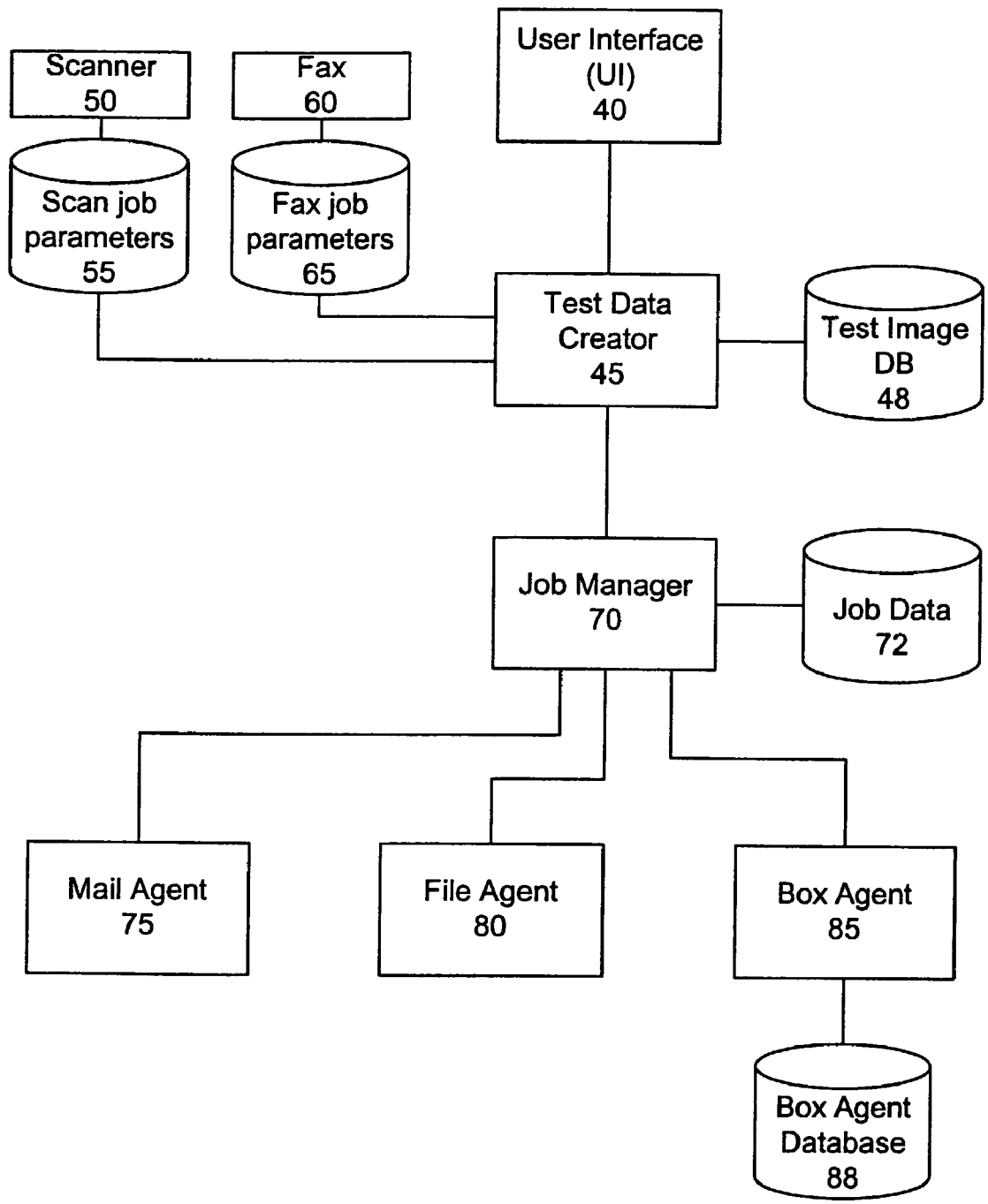
FIG. 2 is a block diagram of a test processing system consistent with the present invention.

To avoid the repeated modification or adjustment of the job in the event that the job cannot be processed properly or at all, a test processing system may be used to verify that the job can be processed properly. FIG. 2 is a block diagram of a test processing system consistent with the present invention. As shown in FIG. 2, the test processing system includes a user interface (UI) 40, a test data creator 45, a test image database 48, a scanner 50, a scan jobs parameter database 55, a fax 60, a fax jobs parameter database 65, a job manager 70, a job data database 72, a mail agent 75, a file agent 80, a box agent 85 and a box agent database 88. These elements of the test processing system may be implemented in an MFP 30, in a server, in one or more storage systems or distributed among some combination of them. In addition, each of these elements may be implemented in software, in hardware or some combination thereof. The explanation of the functions of these elements will be explained in relation to the test job process of FIG. 3.

Figure 3:
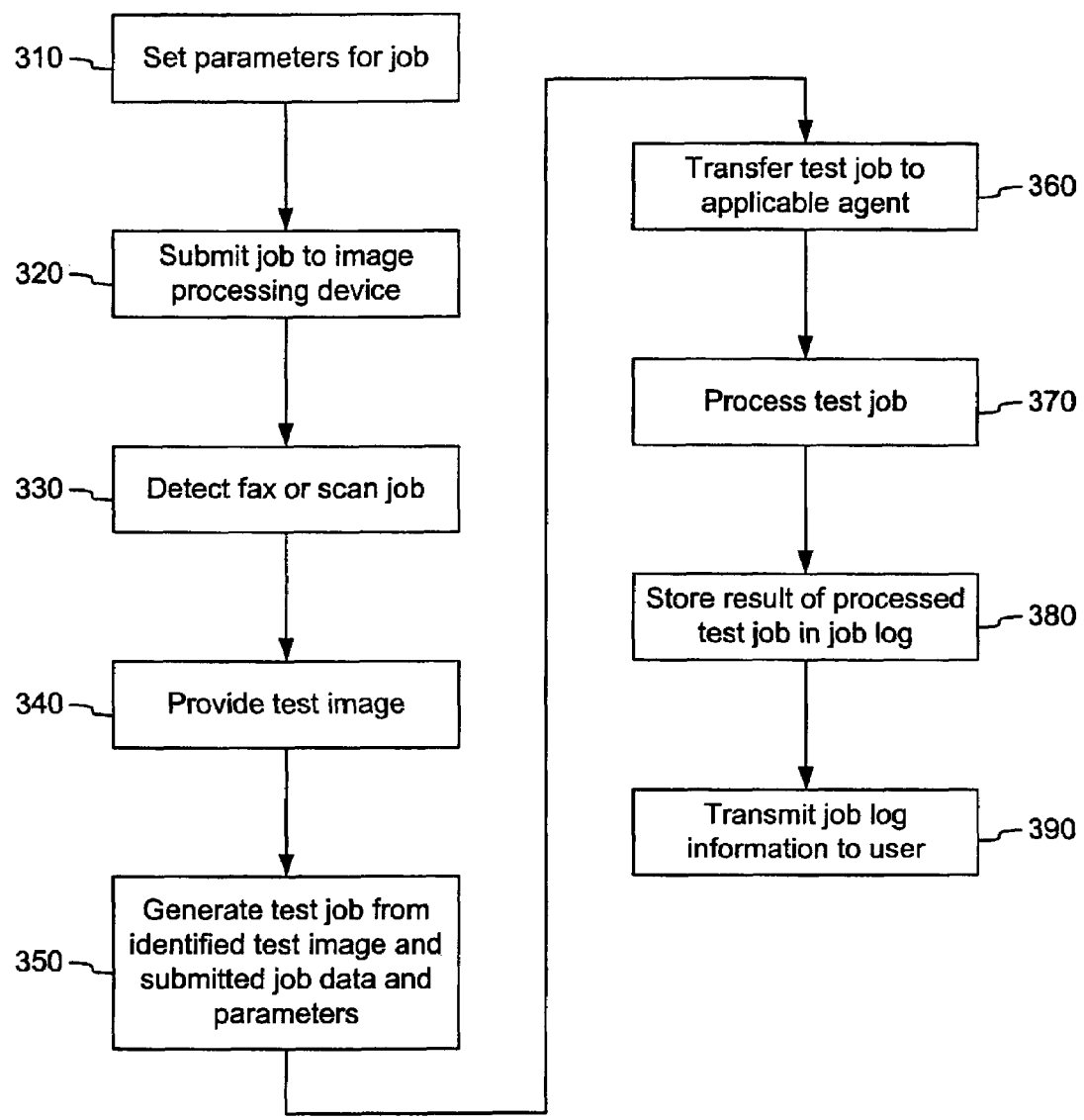
FIG. 3 is a flow diagram for test processing a job consistent with the present invention.

FIG. 3 is a flow diagram for test processing a job consistent with the present invention. As shown in FIG. 3, a user first sets the parameters for the job (step 310). The parameters can be entered by the user at the user's workstation 10. There are a variety of parameters that can be entered by the user for the job. For example, for a scan job, the parameters entered by the user may include identifying the mail agent 75, file agent 80, or box agent 85 to process the job, a destination for the scanned document, a document name for the document being scanned, whether the document is double sided, the number of pages in the document, any rotation of the document, the type of document (e.g., text, photo or both), the resolution, the exposure level, the size of the original document, and the file format into which to make the scanned image. Other parameters for the scan job may also be entered. A fax job may include all of the parameters included in the scan job or some subset thereof, as well as additional parameters, such as a fax number.

Some of the parameters may actually be determined automatically by the MFP 30 which is used to scan or fax the image document. These automatically detected parameters include, for example, the size of the document, the number of pages, the exposure level, and whether the document is color or black and white. However, for the purposes of doing the test processing, the user may be prompted to select actual values for these parameters.

The scan or fax job is then submitted to an image processing device, such as one of the MFPs 30 (step 320). The job can be transmitted to the MFP 30 via the network 20. The submitted job is detected by the UI 40 of the test processing system (step 330). The UI 40 may be located at the MFP 30 to which the job was submitted. Alternatively, the UI 40 may be located at a server coupled to the network 20. The UI 40 is configured to detect jobs transmitted on the network that are for scanning or faxing a document.

The job detected by the UI 40 is forwarded to the test data creator 45. The test data creator 45, like the UI 40, may be located at the MFP 30 to which the job was submitted or at the server coupled to the network 20. The test data creator 45 is configured to generate a test job based on the information in the job submitted by the user.

Based on the information in the job forwarded by the UI 40, the test data creator 45 provides a test image (step 340).

The provided test image can be identified from the test image database 48. The test image database 48 is a database filled with a variety of image types and sizes. The test image database 48 can include a table that includes parameter information about each test image in the database. The parameter information can include all of the parameters related to the image being scanned or faxed, such as paper size, number of pages, resolution, image type and exposure, as well as the name of the test image file. To identify an applicable test image, the parameters of the job set by the user can be compared against the parameter information in the table of the test image database 48 to determine the test image file that most closely matches the parameters of the job. The table can be implemented, for example, as a relational database. It is also possible that a test image can be created dynamically by the test data creator 45 based on the parameters associated with the job.

Figure 4:
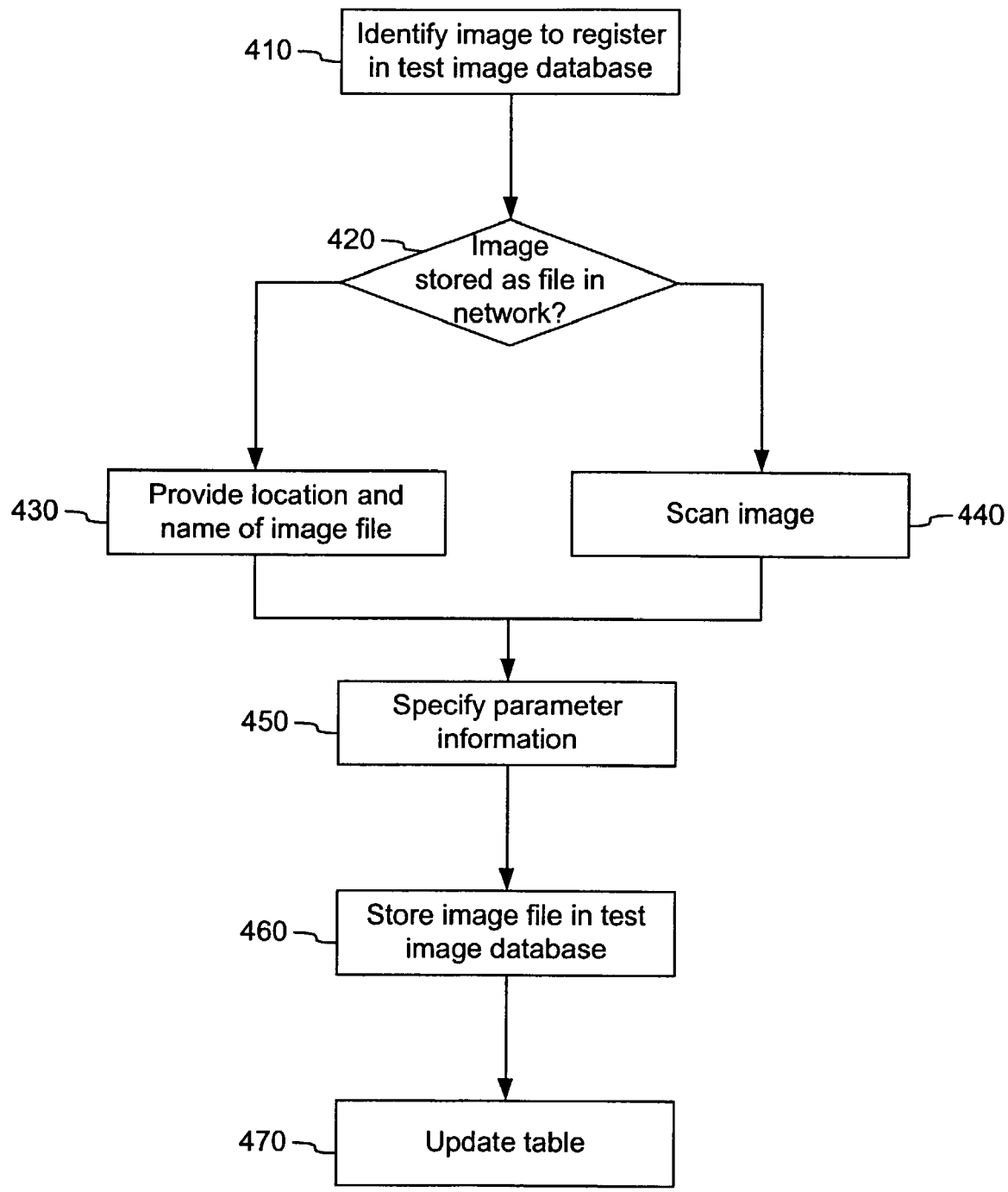
FIG. 4 is a flow diagram for registering images in a test image database consistent with the present invention.

Test images can be included in the test image database 48 through an image registration process. FIG. 4 is a flow diagram for registering images in a test image database consistent with the present invention. As shown in FIG. 4, a user first identifies an image to register in the test image database 48 (step 410). The identified image may be an image file located somewhere in the network 20. Alternatively, the image may be a hardcopy document. After identifying the file, it is determined if the image is stored as a file on the network 20 (step 420). If so, the user provides information regarding the location and name of the file (step 430). If the file is located within a LAN accessible by the test image database 48, the location may be a local address. If the file is locate outside the LAN, such as on a server over the Internet, the location of the file may be a URL.

If the image is not located on a network accessible to the test image database 48, such as when the image is only present on a hardcopy document, the user can scan the image (step 440). To scan the image on the hardcopy document, the user can use an MFP 30 with scanning functionality or an independent scanner device. Regardless of whether the image is stored in an accessible network location, the user also specifies parameter information associated with the image (step 450). The parameter information may include any of the settings or parameters discussed above with respect to setting parameters for a job including, for example, resolution, paper size, image type, and number of pages.

The identified image is then stored in the test image database 48 (step 460). The test image database 48 can be located at the MFP 30, at the server, or in some other storage location in the network 20 accessible to the test processing system. The test image database 48 can be shared by each of the MFPs 30. Alternatively, each MFP 30 can store its own test image database 48. In addition to adding the identified image to the test image database 48, the table associated with the test image database 48 is updated to reflect the addition of the identified image to the test image database 48 (step 470). The table is updated in accordance with the parameter information entered by the user. The process for registering images in the test image database can take place at the user's workstation 10, at the MFP 30 or a combination of both.

Returning to FIG. 3, after the test image has been identified, a test job is generated by the test data creator 45 from the identified test image and the submitted job data and parameters. Accordingly, the test job essentially corresponds to the job submitted by the user, except that it includes the test image identified by the test data creator 45. The test job is then submitted to the job manager 70. The job manager 70 may have a queue of jobs, including both test jobs and actual jobs submitted by users, that are processed. The data, including the parameters, is stored in a job data database 72.

When the test job is selected by the job manager 70 for processing, it determines which agent has been selected to process the job. The job submitted by the user includes information identifying the agent selected to process the job. The information regarding the identified agent is also included in the test job created from the job submitted by the user. The selected agent can be the mail agent 75, the file agent 80 or the box agent 85.

The mail agent 75 is configured to e-mail the scanned or faxed image to an e-mail address identified in the test job, which was included in the job submitted by the user. Since the purpose of the test job is to determine whether the job submitted by the user can be processed properly, the test job is not sent to the address included in the job submitted by the user. Instead, the scanned or faxed image can be e-mailed, for example, to the user submitting the job.

The file agent 80 may be, for example, a file server that stores documents and images that are accessible to the users of the network 20. The file agent 80 can store the faxed or scanned image as a file in the file server. The file agent can also store the faxed or scanned image in a file format identified in the test job, which was included in the job submitted by the user, such as .pdf or .tiff.

The box agent 85 is analogous to the file agent 80, except it is a file repository or document handling system located in the MFP 30 at which the job is being processed. The result of the processing by the box agent 85 is stored in the box agent database 88. The box agent 85 has additional capabilities beyond that of the file agent 80, including the ability to match or divide documents, as well as the ability to make one document from several documents.

After determining which agent has been selected to process the test job, the job manager 70 transfers the test job, including the associated data and parameters held in the job data database 72, to the applicable agent (step 360). The applicable agent, either the mail agent 75, file agent 80, or box agent 85 then processes the test job (step 370). For example, as described above, the processing of the mail agent 75 involves e-mailing the scanned or faxed document to the address of the user submitting the job.

Each of the agents determine whether the processing was completed and whether it was completed successfully. As described above, a job may not be completed successfully if, for example, the size of the scanned document exceeds a size limitation of an e-mail, the scanned document cannot be sent properly, a required password is entered incorrectly, or an invalid file path is provided. In addition, the agents store the result of the processing of the test job in a job log (step 380). The job log stores information identifying the test job that has been processed, the job upon which the test job is based, and information relating to the processing of the test job, including whether it was completed and if it was completed successfully. Each agent may maintain its own job log. Alternatively, each MFP 30 may maintain a single job log to which each agent contributes.

The job log information can be determined from error codes. For example, if the SMTP protocol is used to send an e-mail, an SMTP server can generate an error code and an error message, such as "552 Requested mail action aborted: exceeded storage allocation" defined in RFC841. Similarly, in a Windows shared file system, the OS can generate an error code when it cannot access the specified file server with a specified username and password. If the agent receives no error code, then the agent determines that the job is completed successfully.

After the test job has been processed, the job log is transmitted to the user who submitted the job upon which the test job is based (step 390). The job log can be transmitted to the user by e-mail. Alternatively, the job log may be displayed to the user in a pop-up window. The user can also see the job log information stored in the MFP 30, such as via a web page. The user can review the information in the job log and determine whether or not the test job has been completed successfully. If so, the user knows that the job submitted by the user can also be completed successfully, and processing of the job submitted by the user can proceed. To proceed with the processing of the job, the user can go to the MFP 30 to which the job was submitted and proceed with the completion of the job. The originally submitted job information can be held in either of the scan job parameters database 55 or the fax job parameters database 65, which are used by the scanner 50 and fax 60, respectively, to complete the scan or fax job processing.

However, if the information in the job log indicates that the test job cannot be completed successfully, the user knows that the parameters for the job submitted by the user need to be adjusted before the processing can be completed. The job log information preferably includes details about what parameters were impacted that led to the unsuccessful completion of the test job. Based on this information, the user can adjust the parameters, resubmit the job, and have the resubmitted job go through the test processing. With this iterative process, the user can know whether the scan or fax job can be completed successfully before proceeding to the MFP 30 to complete the processing of the scan or fax job.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for testing one of a scan and a fax job which is processed with an agent in a multi-function peripheral (MFP), the agent being a mail agent, the method comprising:
   receiving a job request at the MFP from a workstation via a network to scan or fax an image, the job request including one or more parameters set in the workstation and a selection of the agent to process the job;
   identifying an applicable test image from a database of test images stored in the MFP based on the one or more parameters set in the workstation;
   generating a test job in the MFP based on the identified test image and the one or more parameters set in the workstation;
   transferring the test job to the agent to process the job;
   processing the test job with the agent receiving the transferred test job;
   storing result information of the test job processed by the agent, the result information including an error code; and
   transmitting result information to the workstation.

2. A method according to claim 1, wherein the result information is stored in a job log, and the result information in the job log includes information regarding whether the test job was processed successfully.

3. A method according to claim 2, further comprising transmitting the result information to the user.

4. A method according to claim 1, wherein the database includes parameter information for each test image, the method further comprising comparing the one or more job parameters with the parameter information for each test image in the database to identify an applicable test image.

5. A method according to claim 1, further comprising:
   receiving image data and parameter information corresponding to the image data; and
   storing the image data in the database with the parameter information.

6. A method according to claim 1, further comprising executing the job request if it is determined that the job request can be executed correctly based on the result information.

7. A method according to claim 1, wherein identifying the test image includes dynamically generating the test image based on the one or more parameters for the job request.

8. A computer system for testing one of a scan and a fax job which is processed with an agent in a multi-function peripheral (MFP), the agent being a mail agent, the computer system comprising:
   a processor; and
   a memory, coupled to the processor, comprising a plurality of instructions executed by the processor, the plurality of instructions configured to:
   receive a job request at the MFP from a workstation via a network to scan or fax an image, the job request including one or more parameters set in the workstation and a selection of the agent to process the job;
   identify an applicable test image from a database of test images stored in the MFP based on the one or more parameters set in the workstation;
   generate a test job in the MFP based on the identified test image and the one or more parameters set in the workstation;
   transfer the test job to the agent to process the job;
   process the test job with the agent receiving the transferred test job;
   store result information of the test job processed by the agent, the result information including an error code; and
   transmit result information to the workstation.

9. A computer system according to claim 8, wherein the result information is stored in a job log, and the result information in the job log includes information regarding whether the test job was processed successfully.

10. A computer system according to claim 9, the memory further comprising an instruction configured to transmit the result information to the user.

11. A computer system according to claim 8, wherein the database includes parameter information for each test image, the memory farther comprising an instruction configured to compare the one or more job parameters with the parameter information for each test image in the database to identify an applicable test image.

12. A computer system according to claim 8, the memory further comprising instructions configured to:
   receive image data and parameter information corresponding to the image data; and
   store the image data in the database with the parameter information.

13. A computer system according to claim 8, the memory further comprising an instruction configured to execute the job request if it is determined that the job request can be executed correctly based on the result information.

14. A computer system according to claim 8, the memory further comprising an instruction configured to dynamically generate the test image based on the one or more parameters for the job request.

15. A computer readable medium operable on a computer system configured to test one of a scan and a fax job which is processed with an agent in a multi-function peripheral (MFP), the agent being a mail agent, the computer readable medium configured to:
receive a job request at the MFP from a workstation via a network to scan or fax an image, the job request including one or more parameters set in the workstation and a selection of the agent to process the job;
identify an applicable test image from a database of test images stored in the MFP based on the one or more parameters set in the workstation;
generate a test job in the MFP based on the identified test image and the one or more parameters set in the workstation;
transfer the test job to the agent to process the job;
process the test job with the agent receiving the transferred test job;
store result information of the test job processed by the agent, the result information including an error code when an error has occurred; and
transmit result information to the workstation.

16. A computer readable medium according to claim 15, wherein the result information is stored in a job log, and the information stored in the job log includes result information regarding whether the test job was processed successfully.

17. A computer readable medium according to claim 16, further configured to transmit the result information to the user.

18. A computer readable medium according to claim 15, wherein the database includes parameter information for each test image, the computer readable medium further configured to compare the one or more job parameters with the parameter information for each test image in the database to identify an applicable test image.

19. A computer readable medium according to claim 15, further configured to:
receive image data and parameter information corresponding to the image data; and
store the image data in the database with the parameter information.

20. A computer readable medium according to claim 15, further configured to execute the job request if it is determined that the job request can be executed correctly based on the result information.

21. A method according to claim 15, further configured to dynamically generate the test image based on the one or more parameters for the job request.

22. A method according to claim 1, further comprising selecting the applicable test image based on the one or more parameters set in the workstation.

23. A method according to claim 1, further comprising performing the test job based on the one or more parameters set in the workstation.

24. A method according to claim 1, further comprising storing result information based on the one or more parameters set in the workstation.

* * * * *